Sept. 25, 1928.

H. V. NYE 1,685,746

SYSTEM OF DISTRIBUTION

Filed Dec. 1, 1924

Inventor
H. V. Nye
by
Attorney

Patented Sept. 25, 1928.

1,685,746

UNITED STATES PATENT OFFICE.

HENRY V. NYE, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

SYSTEM OF DISTRIBUTION.

Application filed December 1, 1924. Serial No. 753,229.

This invention relates to systems of distribution and more particularly to a means for automatically connecting a generator to a distribution system when there is equality of frequency and phase as between said generator and said system. It is accordingly an object of the invention to provide a means of this character, and one which will attain this object in a positive and reliable manner; and which means may be inexpensively manufactured.

Another object is to provide a means whereby motors of the synchronously running type may be used to indicate both equality of frequency and phase as between said motors or the sources to which they are connected and whereby means may be actuated to connect a generator to a line. Still another object is the provision of such means in which equality of phase will produce a positive effect.

A more specific object is the provision of means whereby motors of the synchronously running type with or without separately excited fields may be utilized to produce a predetermined effect when there is equality of frequency and phase as between the motors or sources to which they are connected.

A further object is the provision of means whereby equality of phase may be accurately determined, and, more specifically, determined by simple means. Other objects will appear hereinafter as the description of the invention proceeds.

The novel features of the invention will appear from this specification and the accompanying drawing forming a part thereof and showing several embodiments of said invention and all these novel features are intended to be pointed out in the claims.

Figures 1, 2, 3, 4:
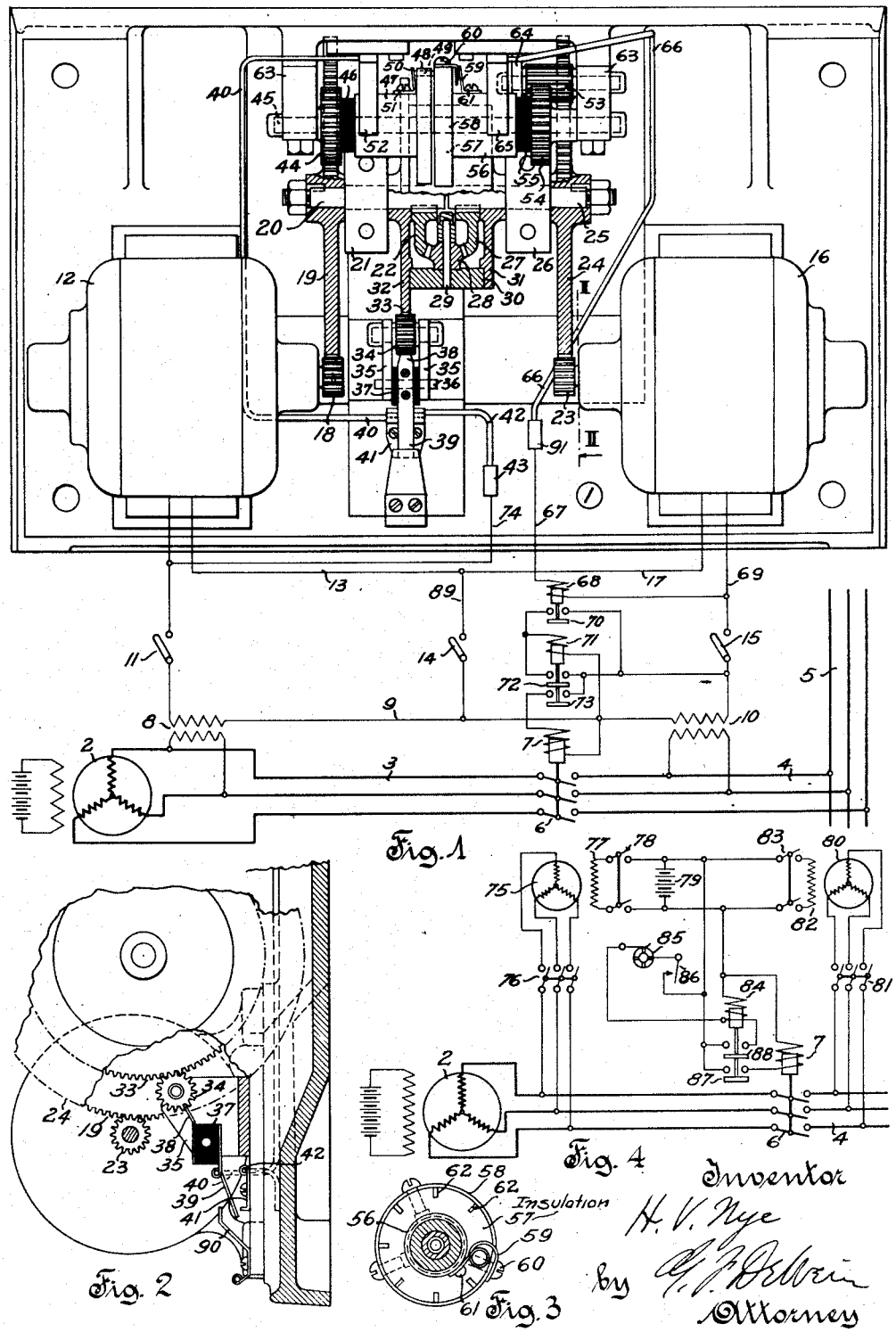
Fig. 1 is a diagrammatic showing of a distribution system in which an automatic synchronizer in accordance with the present invention, has been embodied, the automatic synchronizer proper being shown in front elevation, with certain parts broken away for the sake of clearness.
Fig. 2 is a fragmentary side elevation of the automatic synchronizer proper of Fig. 1, a portion being cut away on the line II—II of that figure.
Fig. 3 is a side elevation of a detail of the automatic synchronizer proper.
Fig. 4 is a diagrammatic showing of a distribution system embodying a modified form of automatic synchronizer also shown diagrammatically.

Referring now to Fig. 1 the automatic synchronizer proper 1 with associated elements, as will appear hereinafter, is adapted to connect a generator 2 having conductors 3 leading therefrom with conductors 4 here shown as connected to buses 5. A circuit breaker 6 is interposed between conductors 3, 4 and the circuit breaker is adapted to be moved to closed position by means of an operating coil 7.

A potential transformer 8 has its primary winding connected across two of the generator leads or conductors 3 and one terminal of its secondary winding connected through a conductor 9 to one terminal of the secondary winding of the potential transformer 10 which latter has its primary winding connected across two of the conductors 4 which correspond to the two conductors across which the primary winding of transformer 8 is connected. The other terminal of the secondary of transformer 8 is connected through a switch 11 to one of the terminals of a motor 12. The other terminal of motor 12 is connected through a conductor 13 through a conductor 89, in which a switch 14 may be interposed, to conductor 9. The other terminal of transformer 10 is connected through a conductor 69, in which a switch 15 may be interposed, to one terminal of a motor 16. The other terminal of motor 16 is connected through conductor 17 to conductor 89.

Motor 12 is provided with a pinion 18 adapted to drive a gear 19 keyed to a shaft 20 operating in a bearing 21. The shaft 20 also carries a bevel gear 22 keyed thereto forming one element of a differential gearing, as will more fully appear. Motor 16 is provided with a pinion 23 adapted to drive a gear 24 keyed to a shaft 25 operating in a bearing 26. The shaft 25 also carries a bevel gear 27 keyed thereto forming another element of the differential gearing. The third element of the differential gearing includes one or more planetary gears 28. The gear 28 is here shown as freely rotatable about a stud shaft 29 mounted in what may be a cylindrical housing 30. The housing 30 is supported and completed by two end plates 31, 32 through which the shafts 25 and 20 respectively freely pass. The end plate 32 is somewhat larger than the end plate 31 and is provided on its periphery with teeth to constitute a gear 33. The gear 33 need of course not be integral with the end plate 32. The gear 33 is adapted to drive a pinion 34 mounted on a shaft supported in the bearing brackets 35.

A pivot shaft 36 which may also be mounted in the bearing brackets 35 carries a block 37, preferably of insulating material. Mounted on block 37 in any suitable manner is a member provided with a tooth like portion 38 adapted to be engaged by the teeth of pinion 34. The block 37 also carries a contact member 39 to which current may be conducted through a flexible conductor 40. The contact 39 is adapted to cooperate with a stationary contact 41 to which a conductor 42, provided with a terminal connector 43, may be connected. A stop 90 may be provided to limit the clockwise rotation of contact 39. The stop 90 may, if desired, be also utilized as a stationary contact.

The gear 19 is also adapted to drive a gear 44 mounted to freely rotate on a stationary shaft 45, the shaft 45 being supported in suitable brackets 63. The gear 44 is adapted to drive an insulating drum 46 carrying a slip ring 47. The insulating drum 46 is also provided with an insulating flange 48 here shown as provided with an axially extending hole near the outer periphery thereof, through which hole a contact 49 is adapted to freely pass. The contact 49 is engaged and biased by a spring 50 which may be fastened to the slip ring 47 by means of a screw 51, the contact 49 being therefore in conducting relation with slip ring 47. A contact 52 is suitably mounted to make wiping contact with the slip ring 47 and this contact is connected by means of conductor 40 to the contact 39.

The gear 24 is adapted to drive a pinion 53 rotatable about a shaft here shown as mounted in the righthand bracket 63 and a bracket 64. The pinion 53 is adapted to drive a gear 54 freely rotatable about shaft 45. An insulating drum 55 is adapted to be driven by the gear 54 and is provided with a slip ring 56. The insulating drum 55 is also provided with an insulating flange 57 the outer periphery of which is here shown as surrounded by a conducting ring 58. The ring 58 may be connected, by means of a conductor 59 fastened to ring 58 by means of a screw 60, to the slip ring 56, to which the conductor 59 is fastened by means of a screw 61.

As will clearly appear from Fig. 3, the flange 57 has notches cut therein in which notches a plurality of contacts 62 are disposed. The contacts 62 may be electrically thoroughly connected to the ring 58 and therefore also to slip ring 56, by soldering said contacts to the ring 58. Inasmuch as the contacts 62 are exposed on the lefthand face of flange 57, as viewed in Fig. 1, they are also adapted to make contact with the contact 49 (which is pressed against flange 57 by spring 50) as the contacts 62 and 49 are relatively rotated. The pinion 53 is interposed between gear 24 and gear 25 so that when gears 19 and 24 are rotated in opposite directions the contact-carrying flange 48 will rotate in the same direction as flange 57. A contact 65, suitably mounted, is adapted to make wiping contact with the slip ring 56 and a conductor 66, having a terminal connector 91, may be connected to contact 65, to which conductor suitable connection may be made as will be pointed out.

The conductor 66 is here shown as connected with a conductor 67 leading to a relay coil 68 the other terminal of said coil being connected to conductor 69. The relay 68 is adapted to lift a contact 70 to thereby close a circuit, here shown as fed from the secondary of transformer 10, through a relay coil 71. The relay 71 is adapted to lift a pair of contact 72, 73. The contact 72 is adapted to close a holding circuit fed from transformer 10, for the coil 71. The contact 73 is adapted to close a circuit, here shown as fed from transformer 10, through the operating coil 7 of circuit breaker 6.

The motors 12, 16 of Fig. 1 may be of a single phase type having a definite pole rotor and no separate excitation and provided with a squirrel cage for starting. The relative position of the rotating fields of the two motors when they are operating at the same frequency and in phase is therefore fortuitous, as distinguished from synchronous motors which are provided with separately excited field windings. In the particular instance illustrated the gear ratio as between the contact 49 and the shaft of motor 12 is two to one. The same is true as to the contact 62 and the shaft of motor 16. If the motors 12, 16 are of the four pole type then for every quarter of a revolution of motor 12 for example, the contact 49 will rotate one-eighth of a revolution. The same is true as to each individual contact 62 with respect to motor 16. As previously pointed out, inasmuch as the relative position in space of the rotating fields of motors 12, 16 is not necessarily always the same even though the lines to which they are connected may be in phase, for a given start from rest to synchronous running speed, it is clear that if only four contacts 62 were provided that contact 49 might be peripherally between two of such four contacts when motors 12, 16 were in phase. It is evident therefore that eight contacts 62 must be provided under these conditions. In general therefore, the number of contacts 62 should be such that one of them passes a fixed point of reference for every 180 electric degrees of advance of the rotor of the associated motor. It is furthermore clear that when motors 12 and 16 are running at the same frequency, contact 49 may make contact with one of the contacts 62 either when the motors are in phase or when they are 180 electric degrees out of phase. How this condition is met will be described in connection with the operation of the system.

The gear 19 preferably, but not necessarily, has a few less teeth than the gear 24 so that when motor 16 is running at a predetermined speed as determined by the frequency of the system 5, and as the generator 2 speeds up thereby increasing the speed of motor 12, the gear 19 will reach a speed equal to that of gear 24 at a predetermined speed of motor 12 somewhat lower than that of motor 16. This is desirable for reasons which have been fully set forth in applicant's copending application Serial No. 696,487, filed March 3, 1924. Briefly, the fact that contact 39 is effectively actuated somewhat before the frequency of generator 2 reaches that of the system 5 insures that from the time contact 39 is actuated and during the period when the difference in frequencies is within safe limits, the generator 2 and the system 5 will be in phase at least once.

It is however evident that the difference in number of teeth of gears 19, 24 has no effect on the gear ratio as between gears 44, 18 and gears 54, 23, these latter two ratios being the same.

The operation of the system of Fig. 1 is as follows: Let it be assumed that the switches 11, 14, 15 have been closed either manually or automatically, that the buses 5 are energized, and that the prime mover driving generator 2 is started, gradually bringing the generator up to normal speed. The motor 16 will soon attain its normal synchronous speed dependent upon the frequency on the buses 5, this motor being fed from transformer 10. The current applied to motor 12 from transformer 8 will gradually increase in frequency and the speed of motor 12 will rise with that of generator 2. The direction of rotation of gear 24 is such that gear 34 will be driven in a counter-clockwise direction thereby swinging the tooth 38 and therefore also the contact 39 in a clockwise direction. When the speed of gears 19, 24 is the same, the gear 33 will stop and as the speed rises a predetermined amount more the direction of rotation of gears 33 and 34 will reverse thereby swinging the contact 39 in a counter-clockwise direction into contact in stationary contact 41. It may be that at this instant contact 49 will be in contact with one of the contacts 62, or, if not, such contact will occur a short time later. If the generator and buses 5 are in phase when such contact is made there will be a circuit from one terminal of the secondary of transformer 8 through switch 11, conductors 74, 42, contacts 41, 39, conductor 40, contact 52, slip ring 47, spring 50, contact 49, one of the contacts 62, conductor 59, slip ring 56, contact 65, conductors 66, 67 relay coil 68, switch 15, one of the terminals of the secondary of transformer 10, and from the other terminal through conductor 9 to the other secondary terminal of transformer 8. The coil 68 will therefore be energized and the circuit of relay 71 will be closed. The latter relay will then close and energize the operating coil 7 of the circuit breaker thereby connecting the generator 2 to the buses 5. When this occurs the switches 11, 14, 15 may be again opened either manually or automatically. If the generator and buses 5 are 180 degrees out of phase when contact 49 engages any one of the contacts 62, the relay coil 68 will not be energized for the reason that the transformers 8, 10 are then bucking each other. It is evident that equality of phase as between the generator 2 and the conductor 4 will be thus very accurately determined.

Referring now to Fig. 4. The motor 75 is here shown as of the three-phase synchronous separately excited type adapted to be fed from generator 2 through a switch 76. This motor corresponds to motor 12 of Fig. 1 and may replace the latter motor in driving the gear 19. Another motor 80 also of the three-phase synchronous separately excited type is adapted to be fed from the conductors 4 through a switch 81. This motor corresponds to motor 16 of Fig. 1 and may replace the latter in driving gear 24. The motor 75 is indicated as provided with a field winding 77 adapted to be fed from a direct current source here shown as a battery 79, through a switch 78. A field winding 82 of motor 80 is similarly adapted to be fed, through a switch 83, from battery 79. A contact carrying disk and cooperating contact 85 are diagrammatically indicated and correspond to the phase indicating elements including the contacts 62 and 49 of Fig. 1 and are to be understood as driven in a manner equivalent to that shown in that figure. The circuit closer 86 connected in series with the phase indicating device 85 corresponds to the contacts 39, 41 of Figs. 1 and 2 and is to be understood as operable in the same manner as illustrated in that figure. If the motors 75, 80 are of the four pole type it is necessary to have but four contacts on the phase indicating device 85 and transformers such as 8, 10 of Fig. 1 may be dispensed with. The contact devices 85, 86 when both closed are adapted to complete a circuit for a relay coil 84 adapted to be fed, as here shown, from the battery 79. The relay 84 is provided with contacts 87, 88. The contact 87 is adapted to complete a circuit for the operating coil 7 of the circuit breaker 6 and the contact 88 is adapted to complete a holding circuit for the coil 84, both of these circuits being fed from battery 79. In the case of Fig. 4, whenever contact is made at the phase indicating device 85 and the relative speeds of motors 75, 80 is such as to have resulted in the closure of contact 86, the motors 75, 80 will be in phase and at the same frequency as will therefore also the generator 2 and the conductors 4. The coil 84 will therefore be energized resulting in the connection, by circuit breaker 6 of generator 2 to conductors 4.

It should be understood that it is not desired to limit the invention claimed to the exact details of construction shown and described, for obvious modifications may occur to a person skilled in the art.

It is claimed and desired to secure by Letters Patent:

1. In a system of alternating current distribution, an alternating current generator, means responding to the frequency of said generator, means responding to the frequency of said system, means differentially responsive to both said frequency responsive means, additional means effectively actuated by said frequency responsive means in response to substantial equality of phase thereof, and means for connecting said generator to said distribution system in response to effective joint actuation of said differentially responsive means and said phase responsive means.

2. In a system of alternating current distribution, an alternating current generator, a synchronous motor fed by said generator, another synchronous motor fed by said system, differential gearing driven by said motors, means effectively actuated in response to said gearing when the difference in speed between said motors is not greater than a predetermined amount, means effectively actuated in response to said motors when said motors are substantially in phase, and means for connecting said generator to said distribution system in response to effective joint actuation of said gearing responsive means and said phase responsive means.

3. In a system of alternating current distribution, an alternating current generator, a synchronous motor fed by said generator, another synchronous motor fed by said system, differential gearing driven by said motors, means for closing an electrical contact in response to said gearing when the difference in speed between said motors is not greater than a predetermined amount, means responsive to said motors for closing another electrical contact when said motors are substantially in phase, and means for connecting said generator to said distribution system in response to effective joint actuation of said electrical contacts.

4. In a system of alternating current distribution, an alternating current generator, a potential transformer fed by said generator, frequency responsive means fed by said transformer, another potential transformer fed by said system, frequency responsive means fed by said other transformer, means responsive to both said frequency responsive means, additional means effectively actuated by both said frequency responsive means in response to substantial equality of phase thereof, means for connecting said generator to said distribution system, and means fed from said transformers in series in response to joint effective actuation of said means responsive to said frequency responsive means, and said means responding to equality of phase for controlling said generator connecting means.

5. In a system of alternating current distribution, an alternating current generator, a potential transformer fed by said generator, frequency responsive means fed by said transformer, another potential transformer fed by said system, frequency responsive means fed by said other transformer, means responsive to both said frequency responsive means, additional means effectively actuated by both said frequency responsive means in response to substantial equality of phase and substantial opposition of phase, means for connecting said generator to said distribution system, and means connectible to said transformers in series in response to joint effective actuation of said means responding to said frequency responsive means, and said means responding to phase relation for controlling said generator connecting means.

6. In a system of alternating current distribution, an alternating current generator, a potential transformer fed by said generator, frequency responsive means fed by said transformer, another potential transformer fed by said system, frequency responsive means fed by said other transformer, a contactor operatively related to both said frequency responsive means and adapted to be closed when the difference in frequencies between said generator and system is not greater than a predetermined amount, a contactor operatively related to both of said frequency responsive means and adapted to be closed when there is substantial equality of phase as between said two frequency responsive means, means for connecting said generator to said distribution system and means fed from said transformers in response to joint closure of said contactors for controlling said generator connecting means.

7. In a system of alternating current distribution, an alternating current generator, a potential transformer fed by said generator, frequency responsive means fed by said transformer, another potential transformer fed by said system, frequency responsive means fed by said other transformer, a contactor operatively related to both said frequency responsive means and adapted to be closed when the difference in frequencies between said generator and system is not greater than a predetermined amount, a contactor operatively related to both of said frequency responsive means and adapted to be closed when there is substantial equality of phase and substantial opposition of phase as between said two frequency responsive means, means for connecting said generator to said distribution system and means fed from said transformers when said transformers feed said means in phase with each other, in response to joint closure of said contactors for controlling said generator connecting means.

8. In combination, two synchronous motors, a differential gearing driven thereby, a contactor operable by said gearing, a rotatable contact operable by one of said motors, and another rotatable contact disposed to be engageable by said first named contact and operable by the other of said motors.

9. In combination, two synchronous motors, a differential gearing driven thereby, a contactor operable by said gearing, a rotatable contact operable by one of said motors, another rotatable contact disposed to be engageable by said first named contact and operable by the other of said motors, and means for connecting said contactor and contacts in series.

10. In combination, two synchronous motors, a differential gearing, means whereby one of said motors when running at a certain speed drives an element of said gearing at a predetermined speed, means whereby the other of said motors when running at the same certain speed as said first motor drives another element of said gearing at a lower predetermined speed, a contactor operable by said gearing, a rotatable contact operable by one of said motors, and another rotatable contact disposed to be engageable by said first named contact and operable by the other of said motors.

11. In combination, two synchronous motors, a differential gearing, means whereby one of said motors when running at a certain speed drives an element of said gearing at a predetermined speed, means whereby the other of said motors when running at the same certain speed as said first motor drives another element of said gearing at a lower predetermined speed, a contactor operable by said gearing, a rotatable contact operable by one of said motors at a certain speed ratio, another rotatable contact disposed to be engageable by said first named contact and operable by the other of said motors at the same said certain speed ratio.

12. In combination, two self starting synchronous motors, a differential gearing driven thereby, a contactor operable by said gearing, a rotatable contact operable by one of said motors, and a rotatable member provided with a plurality of circumferentially disposed contacts disposed to be engageable by said first named contact and operable by the other of said motors, the number of said plurality of contacts being such that one of them passes a fixed point of reference for every 180 electrical degrees of advance of the rotor of the associated motor.

In testimony whereof, the signature of the inventor is affixed hereto.

HENRY V. NYE.